US011338591B1

(12) United States Patent
Kailey et al.

(10) Patent No.: US 11,338,591 B1
(45) Date of Patent: May 24, 2022

(54) DEFECTIVE NOZZLE CORRECTION MECHANISM

(71) Applicants: Walter .F Kailey, Boulder, CO (US); Nikita Gurudath, Boulder, CO (US); Mikel Stanich, Boulder, CO (US); William Manchester, Boulder, CO (US); Ziling Zhang, Boulder, CO (US)

(72) Inventors: Walter .F Kailey, Boulder, CO (US); Nikita Gurudath, Boulder, CO (US); Mikel Stanich, Boulder, CO (US); William Manchester, Boulder, CO (US); Ziling Zhang, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/193,969

(22) Filed: Mar. 5, 2021

(51) Int. Cl.
| | | |
|---|---|---|
| *B41J 2/21* | (2006.01) | |
| *B41J 2/045* | (2006.01) | |
| *G06K 15/02* | (2006.01) | |
| *G06K 15/10* | (2006.01) | |

(52) U.S. Cl.
CPC ......... *B41J 2/2139* (2013.01); *B41J 2/04586* (2013.01); *G06K 15/102* (2013.01); *G06K 15/186* (2013.01); *G06K 15/1898* (2013.01)

(58) Field of Classification Search
CPC .................................................. B41J 2/2139
USPC ....................................................... 358/3.24
See application file for complete search history.

(56) References Cited

U.S. PATENT DOCUMENTS

| | | |
|---|---|---|
| 6,270,187 B1 | 8/2001 | Murcia et al. |
| 7,024,126 B2 | 4/2006 | Kellie et al. |
| 8,235,490 B2 | 8/2012 | Chandu et al. |
| 8,322,811 B2 | 12/2012 | Chandu et al. |
| 8,542,418 B2 | 9/2013 | Chandu et al. |
| 8,573,731 B2 | 11/2013 | Bastani et al. |
| 8,699,103 B2 | 4/2014 | Mestha et al. |
| 8,967,757 B2 | 3/2015 | Bastani et al. |

(Continued)

FOREIGN PATENT DOCUMENTS

| | | |
|---|---|---|
| EP | 1197916 A2 | 4/2002 |
| EP | 1157840 B1 | 7/2007 |

(Continued)

OTHER PUBLICATIONS

Hansen et al., "High-Throughput Printing via Microvascular Multinozzle Arrays", Advanced Materials, 25(1), pp. 96-102.

(Continued)

*Primary Examiner* — Jacky X Zheng
(74) *Attorney, Agent, or Firm* — Jaffery Watson Mendonsa & Hamilton LLP

(57) ABSTRACT

A printing system is disclosed. The printing system includes at least one physical memory device to store nozzle correction logic and one or more processors coupled with at least one physical memory device to execute the nozzle correction logic to receive a uniformity compensated transfer function for each of a plurality of pel forming elements, receive an average missing neighbor transfer function, receive a defective nozzles list including one or more of the plurality of pel forming elements indicated as defective during print production; and perform missing neighbor processing by applying the average missing neighbor transfer function associated with the pel forming element determined to be a neighbor of a defective pel forming element.

20 Claims, 15 Drawing Sheets

(56) References Cited

U.S. PATENT DOCUMENTS

| | | |
|---|---|---|
| 9,621,762 B2 | 4/2017 | Chandu et al. |
| 9,661,154 B1 | 5/2017 | Stanich et al. |
| 9,785,873 B2 | 10/2017 | Stanich et al. |
| 9,914,309 B2 | 3/2018 | Billow et al. |
| 10,082,990 B2 | 9/2018 | Martin et al. |
| 10,488,846 B2 | 11/2019 | Donovan et al. |
| 10,549,523 B2 | 2/2020 | Stanich et al. |
| 11,216,710 B1 * | 1/2022 | Stanich ............... H04N 1/4015 |
| 2005/0243340 A1 | 11/2005 | Tai et al. |
| 2006/0072160 A1 | 4/2006 | Yamazaki |
| 2009/0284762 A1 | 11/2009 | Zhang et al. |
| 2012/0050755 A1 | 3/2012 | Chandu |
| 2013/0021400 A1 | 1/2013 | Tamagawa |
| 2013/0076825 A1 | 3/2013 | Szafraniee |
| 2013/0176600 A1 | 7/2013 | Chandu |
| 2013/0293611 A1 | 11/2013 | Ueshima |
| 2014/0313255 A1 | 10/2014 | Ukishima |
| 2015/0062233 A1 | 3/2015 | Ueshima |
| 2016/0052318 A1 | 2/2016 | Humet Pous |
| 2016/0100079 A1 | 4/2016 | Gerrits |
| 2017/0236041 A1 | 8/2017 | Stanich |
| 2018/0008995 A1 | 1/2018 | Baker et al. |
| 2018/0022131 A1 | 1/2018 | Klinger et al. |
| 2018/0234582 A1 | 8/2018 | Stanich et al. |
| 2018/0236776 A1 * | 8/2018 | Stanich ............... G06K 15/027 |
| 2019/0389227 A1 | 12/2019 | Stanich et al. |
| 2020/0094546 A1 | 3/2020 | Samadzadegan |

FOREIGN PATENT DOCUMENTS

| | | |
|---|---|---|
| JP | 2018133801 A | 8/2018 |
| WO | 2008059264 A1 | 5/2008 |

OTHER PUBLICATIONS

Vantram, S. R. (2014). Fully Automated Calibration Procedure to Compensate Print Non-uniformities Incurred in Fixed Print-head Array Structures. Retrieved from https://jp.ricoh.com/-/Media/Ricoh/Sites/jp_ricoh/technology/techreport/39/pdf/RTR39a18.pdf See highlighted sections.

Office Action from U.S. Appl. No. 16/995,999, dated May 10, 2021, 15 pages.

Office Action from U.S. Appl. No. 17/194,906, dated Jan. 13, 2022, 14 pages.

Office Action from U.S. Appl. No. 17/194,906, dated Nov. 23, 2021, 16 pages.

Extended European Search Report for EP21191026.0, 11 pages, dated Jan. 5, 2022.

\* cited by examiner

Original Thresholds

| Small | Med | Large |
|---|---|---|
| 29 | 134 | 218 |
| 26 | 181 | 250 |
| 91 | 229 | 245 |
| 87 | 222 | 236 |
| 91 | 187 | 233 |
| 99 | 103 | 228 |
| 48 | 150 | 205 |
| 106 | 178 | 190 |
| 85 | 253 | 254 |
| 5 | 79 | 108 |
| 127 | 149 | 227 |

Missing Neighbor Thresholds

| Small | Med | Large |
|---|---|---|
| 10 | 77 | 102 |
| 17 | 72 | 123 |
| 52 | 90 | 154 |
| 79 | 141 | 150 |
| 41 | 115 | 133 |
| 30 | 51 | 158 |
| 47 | 76 | 130 |
| 65 | 97 | 107 |
| 34 | 160 | 160 |
| 4 | 23 | 51 |
| 39 | 40 | 140 |

Tabulate

Figure 9

DEFECTIVE NOZZLE CORRECTION MECHANISM

FIELD OF THE INVENTION

The invention relates to the field of image reproduction, and in particular, to Jet-Out correction.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles for the ejection of ink or any colorant suitable for printing on a medium.

Prior to commencing printing operations uniformity compensation may be performed to compensate for measured response differences for a print head nozzle which is not jetting. However, various nozzles may become defective during printer operation, which may lead to changes in jetting output (jet-out conditions) caused by the defective nozzles.

Currently, printers must be taken offline to perform a subsequent uniformity compensation to account for the defective nozzles. Taking the printer offline is undesirable since stopping print production leads to lost revenue. Accordingly, a mechanism to correct jet-out conditions in real time is desired.

SUMMARY

In one embodiment, a printing system is disclosed. The printing system includes at least one physical memory device to store nozzle correction logic and one or more processors coupled with at least one physical memory device to execute the nozzle correction logic to receive a uniformity compensated transfer function for each of a plurality of pel forming elements, receive an average missing neighbor transfer function, receive a defective nozzles list including one or more of the plurality of pel forming elements indicated as defective during print production and perform missing neighbor processing by applying the average missing neighbor transfer function associated with the pel forming element determined to be a neighbor of a defective pel forming element.

BRIEF DESCRIPTION OF THE DRAWINGS

A better understanding of the present invention can be obtained from the following detailed description in conjunction with the following drawings, in which:

FIG. 9 illustrates one embodiment of thresholds;

DETAILED DESCRIPTION

A mechanism to correct jet-out conditions in real time is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
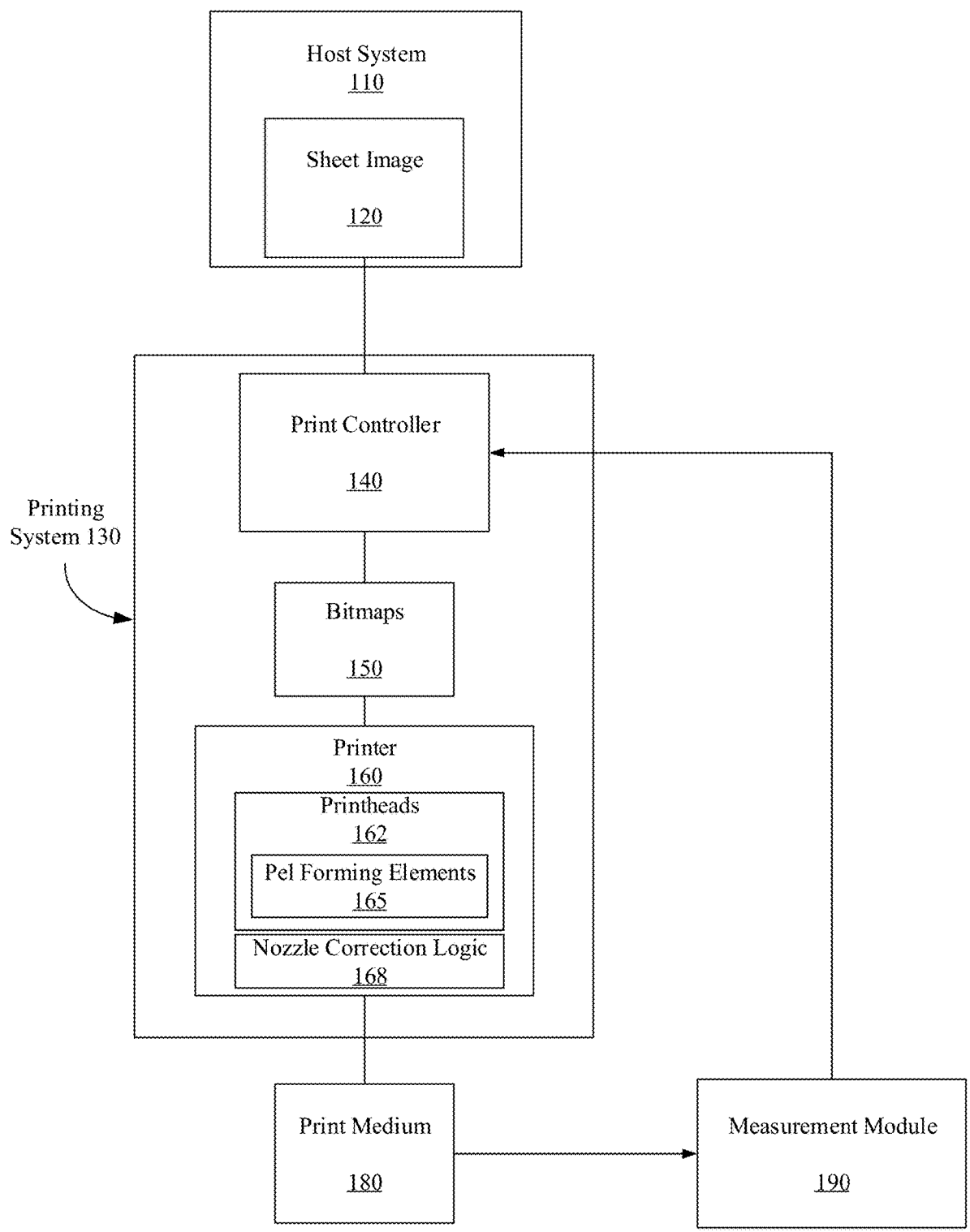
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser).

In the case of a LASER electrophotographic printer the methods described can be used to compensate for a non-functioning LASER imaging element, where multiple beams are used to simultaneously image the photoconductor. In the case of a LED electrophotographic printer the methods described can be used to compensate for a non-functioning LED imaging element, where an array of LEDs is used to simultaneously image the photoconductor.

The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a calibration system to obtain measurements of the printed medium 180. The measured results are communicated to print controller 140 to be used in the calibration process. The measurement system may be a stand-alone process or be integrated into the printing system 130.

According to one embodiment, measurement module 190 may be a sensor to take measurements of printed images on print medium 180. Measurement module 190 may generate and transmit measurement data 222. Measurement data 222 may be OD (e.g., optical density), RGB or other optical response data corresponding to a printed image. In one embodiment, measurement module 190 may comprise one or more sensors that each or in total take optical measurements for printed markings produced for some or all pel forming elements 165. In another embodiment, measurement module 190 may be a camera system, in-line scanner, densitometer or spectrophotometer. In a further embodiment, measurement data 222 may include a map information to correlate measurement data 222 (e.g., OD data) to the corresponding pel forming elements 165 that contributed to the portions of the measurement data 222. In another embodiment, the print instructions for a test pattern (e.g., step chart) provides the correlation of the portions of the measurement data 222 to the corresponding pel forming elements 165 that contributed to the portions of the measurement data 222.

Figure 2:
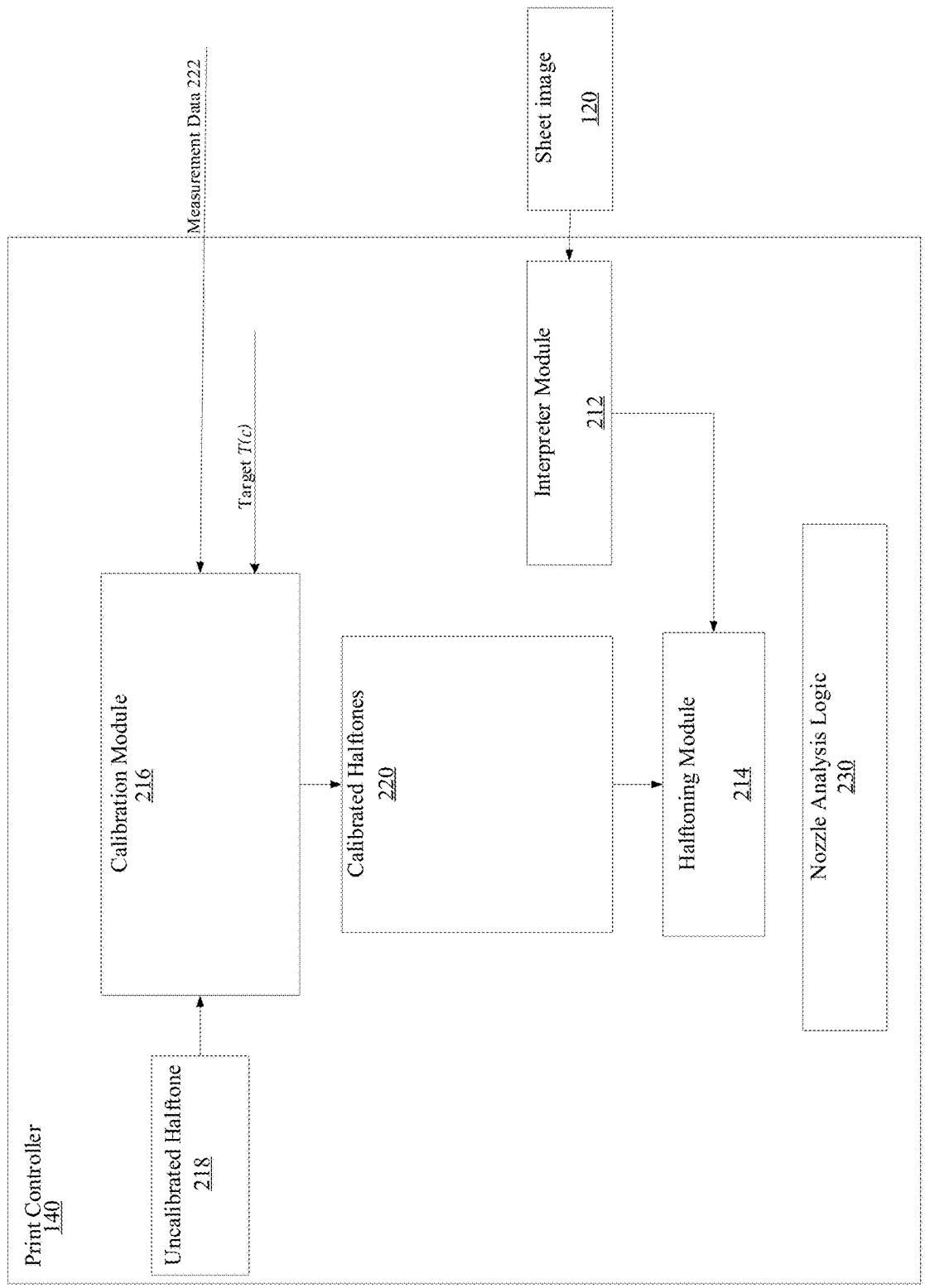
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a calibration module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger drop sizes, beginning with zero and ending with a maximum drop size (e.g., threshold arrays such as single bit threshold arrays or multibit threshold arrays). In another embodiment, the halftone design may include a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. This set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the pel values in the sheetside bitmap.

Calibration module 216 performs a calibration process on an un-calibrated halftone 218, or a previously generated uniformity compensated halftone, received at print controller 140 to generate one or more calibrated halftones 220. Calibrated halftones 220 are then received at halftoning module 214 along with the sheetside bitmap. In one embodiment, an un-calibrated halftone 218 represents a reference halftone design that is modified to create the calibrated halftones. In such an embodiment, measurements of the system response (e.g., measurement data 222) are received via measurement module 190 using the un-calibrated halftone 218 for printing.

Figure 3:
FIG. 3 illustrates one embodiment of calibration module.

FIG. 3 illustrates one embodiment of calibration module 216. As shown in FIG. 3, calibration module 216 includes uniformity compensation module 310. According to one embodiment, uniformity compensation module 310 performs an iterative process to achieve uniformity compensation of a calibrated halftone. As used herein, uniformity compensation is defined as a calibration to compensate for measured response differences at a single pel, by a pel forming element 165 (e.g., print head nozzle). The uniformity compensation can in some cases be achieved after a single iteration.

In one embodiment, uniformity compensation module 310 generates an initial step chart based on an un-calibrated halftone 218. In such an embodiment, the initial step chart uses a threshold array associated with the uncalibrated halftone design to generate the calibration step chart. However, in subsequent iterations, step charts are generated based on a threshold array associated with a current uniformity compensated halftone.

In a further embodiment, the calibration step chart is printed by the pel forming elements 165 of printer 160, and an image of the calibration step chart is measured by measurement module 190 (e.g., via a scanner). In such an embodiment, measurement module 190 generates print image measurement data, which includes OD data measured for a uniform grid across the web of the print medium for each pel forming element 165.

The calibration step chart typically includes a number of steps (e.g., bars or stripes) of uniform density in which there may be at least one halftone pattern for each color of ink used by the printer. The stripe densities range from paper white (no ink) to maximum density for each ink color. The steps or bars are arranged so that every segment or portion of the print head prints every color and a representative set of shades of every color of ink. Enough pixels are included in the height of the bar so that the random variations in the halftone design are minimized by averaging measured densities along the bar height.

Uniformity compensation module 310 receives the OD data at each tint level for all nozzles and determines whether the OD variations for the pel forming elements 165 are less than a predetermined threshold associated with the target uniformity compensation specification. OD variations are differences in the average measured OD values of the printing resulting from one print head nozzle (e.g., pixel) versus measured OD values from one or more other nozzles in response to the same color value input being printed. In one embodiment, the predetermined threshold is received at uniformity compensation module 310 from a system user via a graphical user interface (GUI) 340.

Upon a determination that the variations are less than the pre-determined threshold, uniformity compensation module 310 transmits a message indicating that a uniformity compensated halftone has been achieved (e.g., the OD variations are less than the pre-determined threshold). However, upon a determination that the variations are greater than the pre-determined threshold, measurement data associated with each of the pel forming elements 165 (e.g., nozzle measurement data) is generated. In one embodiment, the nozzle measurement data comprises an interpolation of the measured OD data. Subsequently, uniformity compensation module 310 may initiate the generation and printing of a revised calibration step chart.

According to one embodiment, an inverse transfer function (or ITF) for each of the pel forming elements 165 may be generated by uniformity compensation module 310 based on the OD data and a received uniformity compensation target function. According to another embodiment, a transfer function (TF) for each of the pel forming elements 165 may be generated by uniformity compensation module 310 based on the OD data and a received uniformity compensation target function. As defined herein, a transfer function is defined as a mapping of an input digital count to an output digital count for a system, where digital count is the gray level or color value representing the pels in a bitmap 150 (FIG. 1). Transfer functions (or inverse transfer functions) may be received or generated (e.g., generated based on target OD versus input digital count data and measured OD versus output digital count data).

An inverse transfer function is the reversed (e.g., inverted) application of the digital count data, where the output digital count values of the transfer function form the input digital count values of the inverse transfer function and the input digital count values of the transfer function form the output digital count values of the inverse transfer function.

Figure 4:
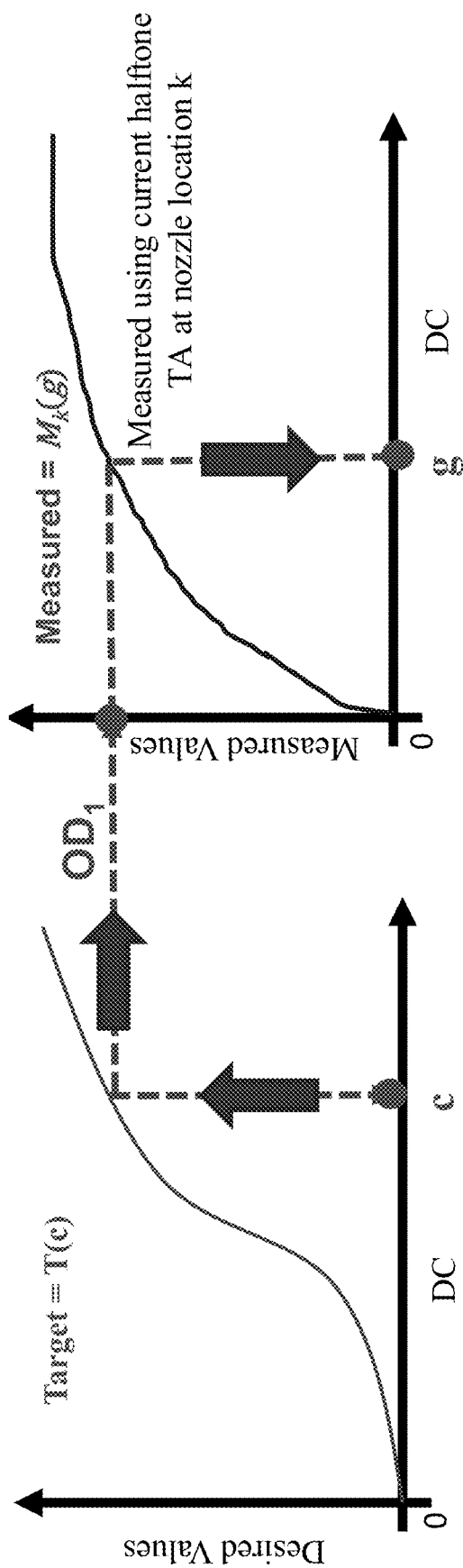
FIG. 4 illustrates one embodiment of an inverse transfer function of a nozzle.

FIG. 4 illustrates one embodiment of an inverse transfer function of a nozzle. As shown in FIG. 4, the inverse transfer function of a pel forming element (e.g., nozzle) is represented as $U_k(g)=c=TF_k^{-1}(g)$. Alternately, the inverse transfer functions for all nozzle locations k can be computed directly using $T^{-1}(M_k(g))$. Target OD response $T(c)$ is used as a uniformity objective for all nozzles for a current halftone, where $\{h_{k1}\}_i$ is the three-dimensional Threshold Array for iteration i, column location k and drop size level 1. The Threshold Array includes thresholds for all drop sizes. Thresholds for column k are used in the halftoning process to print using nozzle k. Therefore, there is a one to one correspondence between nozzles from the ink jet array to columns of the threshold array.

The rows of the threshold array are not included for simplicity. The curly brackets are used to indicate sets of threshold values. It should be understood that the entire threshold array is three dimensional, with rows in the web movement direction, columns corresponding to each nozzle and planes corresponding to each nonzero drop size. In one embodiment, the same target is used for all nozzles to achieve uniform printing. $U_k$ represents the inverse transfer function for nozzle k, which maps color value g to color value c in FIG. 4. $U_k$ may be determined by following the dotted line path in the opposite direction of the indicated arrows.

In one embodiment, the color values are the Digital Count (DC) levels, which are 0 to 255, for a typical 8-bit printing system. In such an embodiment, the inverse transfer function of a color value g is the color value c, whose target value $T(c)$ is the measured value $M_k(g)$ that results when the color value g is printed. $T(c)$ may be set the same for all nozzles to provide uniformity between all nozzles. The value $M_k(g)$ is the measured OD at the cross print medium (e.g., web) location corresponding to nozzle k and the current halftone (e.g., threshold array). $U_k$ may be computed directly, rather than by inverting a TF, starting from $M_k(g)$, and then finding $T^{-1}(M_k(g))$. The inverse of the target function $T^{-1}$ may be found by tabulating the target function in two columns having all c and g values, and subsequently swapping the columns. The measured response $M_k(g)$ at nozzle location k may be measured with the entire Threshold Array employed for printing, so as to include contributions from adjacent compensated nozzles. Employing scanned image data, the data is interpolated to obtain the measured response for the nozzle at location k. Alternately the Measured and Target responses can be assumed to be continuous functions which are obtained based on regressions to the measured data.

As shown in FIG. 4, the Transfer Function $TF(c)=g$. In one embodiment, the transfer function of color value c is a color value g that, when color value g is printed by the print system, causes the target optical density at color value c to be obtained as the measured value. $TF(c)$ may be determined as shown in FIG. 4 by following the dotted line path in the direction of the indicated arrows. This is because c and g both have the same Optical Density $OD_1$ associated with them. Color c occurring in the target domain and color g in the measured domain systems. The $TF(c)$ may be derived from $T(c)$ and $M_k(g)$ by tabulating the matching color pairs for optical densities as explained here for colors c and g. $U_k$ may then be determined by inverting $TF_k$.

According to one embodiment, uniformity compensation module 310 generates an updated uniformity compensated halftone by modifying all of the thresholds in each column of the threshold array corresponding with the current halftone using the generated inverse transfer function for each respective nozzle. In this embodiment, the inverse transfer function for each column (or nozzle) (k) is used at each iteration to transform the current threshold values $\{h_{kl}\}_{i-1}$ of the compensated halftone from the previous iteration. This creates threshold values for a compensated halftone, $\{h_{kl}\}_i$. This process generates thresholds in the compensated threshold array, based on the corresponding thresholds from the current threshold array.

In one embodiment, each threshold of the compensated threshold array is determined by using the transformation defined by the corresponding ITF applied to each threshold for all corresponding pels and drop sizes. If the ITF is assumed to be a continuous function, threshold values after transformation are rounded to integer threshold values. The range of threshold values in the Threshold Arrays created may match the bit depth of image data in the imaging path. Halftones having bit depths higher than that of the imaging path may be employed, by generating down sampled halftones or bit shifting the image data to match the halftone thresholds.

For example, each level (l) of a multi-level halftone represents a drop or dot size, where level l=0 represents small drop or dot in the case where the halftone includes small, medium, and large. Thresholds are only required for non-zero drop sizes. In a web wide halftone, each nozzle/column k of a print head has a set of halftone thresholds for each level l of the multilevel halftone, $\{h_{k,l}\}$. After iteration (i) the uniformity compensated halftone threshold array is: $\{h_{k,l}\}_i = U_{k,i}( \ldots U_{k,1}( \ldots U_{k,1}(\{h_{kl}\}_0) \ldots ))$, where $U_{k,i}$ is the inverse transfer function for nozzle k at iteration i. The uncalibrated initial halftone threshold array is given by $\{h_{kl}\}_0$. This results in convergence towards uniform response in the halftoned image.

In an alternative embodiment, uniformity compensation module 310 may apply transfer functions directly to image data. In this embodiment, the uncalibrated halftone is not modified. Instead, the image data is transformed prior to halftoning. Thus, a transfer function is generated for each nozzle, rather than inverse transfer functions, to generate the current cumulative transfer function. It is important to distinguish between the cumulative transfer function determined in this way:

$TFC_i(c)=TF_i(TF_{i-1}( \ldots TF_1(c) \ldots ))$ from the current transfer function at iteration i, $TF_i(c)$. The cumulative transfer function is, in other words, the composition of transfer functions determined by measurement at each iteration, i. Additionally, this embodiment includes uniformity compensation module 310 generating a calibration step chart using the halftone (e.g., threshold array) and transfer function applied to the image data.

In one embodiment, the same uncalibrated halftone is employed for printing in this embodiment and only the cumulative transfer function is recomputed to obtain the current cumulative transfer function after iteration i. Assuming the cumulative transfer function is $TFC_{k,i}$ for nozzle k after iteration i, the current cumulative transfer function for all nozzles is $$TFC_{k,i}=TF_{k,i}(TF_{k,i-1}( \ldots (TF_{k,1}) \ldots ))$$

where $TF_{k,i}$ is the transfer function for nozzle k, as measured after iteration i. An initial transfer function $TF_{k,0}$ is used, which typically is the identity transfer function. In another embodiment an initial transfer function derived based on engine calibration might be used. This results in convergence towards uniform response in the uniformity compensated halftoned image, employing cascaded transfer functions instead of uniformity calibrated halftones.

Figure 5:
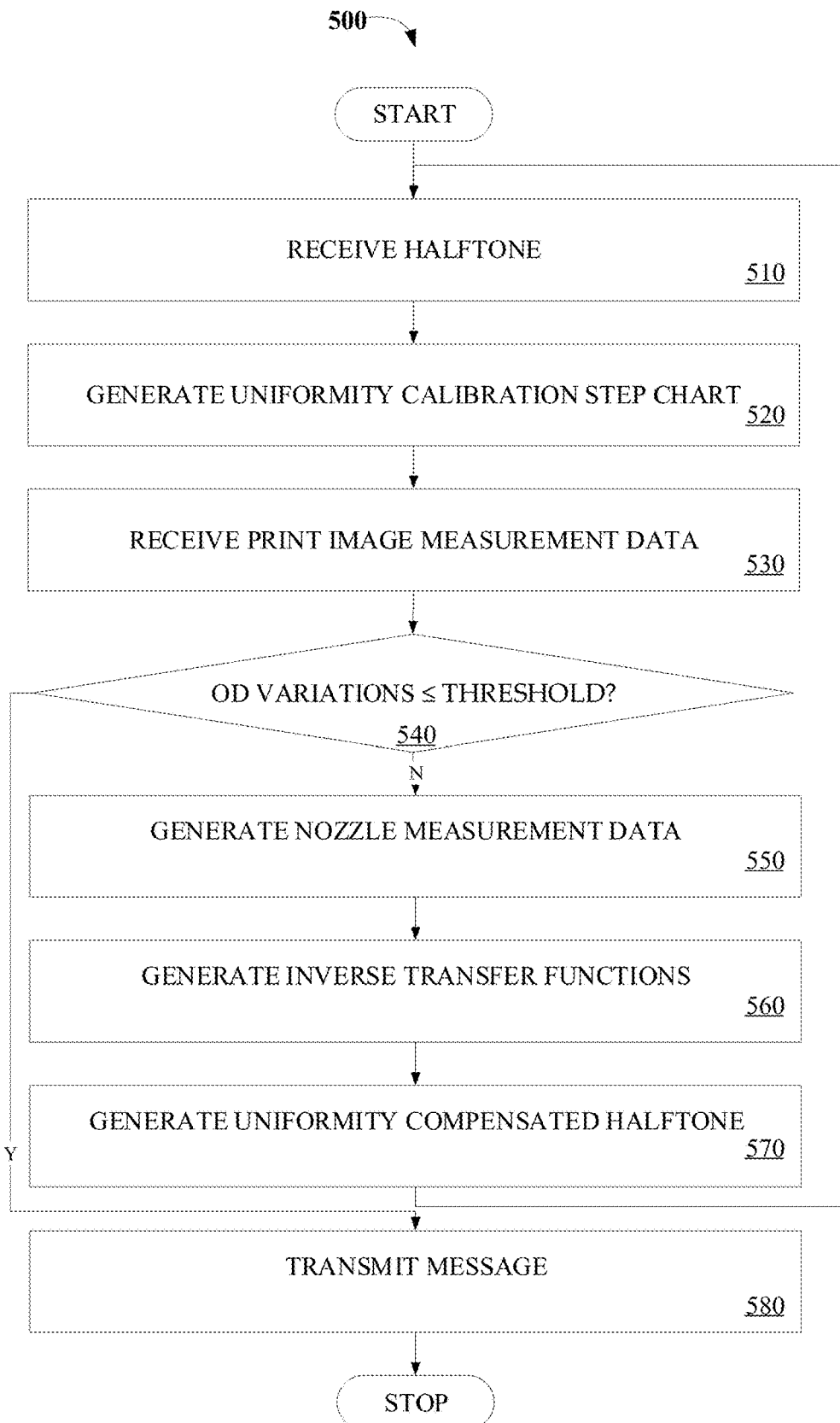
FIG. 5 is a flow diagram illustrating one embodiment of a uniformity compensation process performed by a printing system.

FIG. 5 is a flow diagram illustrating one embodiment of a process 500 for performing uniformity compensation. Process 500 may be performed by processing logic that may include hardware (e.g., circuitry, dedicated logic, programmable logic, microcode, etc.), software such as instructions run on a processing device, or a combination thereof. In one embodiment, process 500 is performed by uniformity compensation module 310.

At processing block 510, a halftone (e.g., halftone design) is received. In the first iteration of the process, the halftone is an uncalibrated halftone. At processing block 520, a uniformity calibration step chart is generated by applying the halftones. This chart may have cross web stripes having the same tint level, ranging from zero to 100% tint levels in multiple steps. At processing block 530, the uniformity calibration chart is printed and print image measurement data from measuring the chart, including the OD measurement data, is received. At decision block 540, a determination is made as to whether OD variations are less than or equal to the predetermined threshold. If so, OD variations are less than or equal to the predetermined threshold, a message is transmitted indicating that a uniformity compensated halftone has been achieved, processing block 580. As discussed above, the message may include uniformity compensated halftone values. In some embodiments, a message may also be transmitted indicating that the variations are greater than the pre-determined threshold (e.g., indicating that another iteration is to be performed).

At processing block 550, nozzle measurement data is generated upon a determination that the OD variations are greater than the predetermined threshold. As discussed above, the nozzle measurement data may be generated by interpolating the OD measurement data. At processing block 560, inverse transfer functions are generated for each nozzle to achieve the target OD response for each nozzle.

At processing block 570, a uniformity compensated halftone is generated by modifying the thresholds in each column of the threshold array using the inverse transfer function for each nozzle. By performing these steps on a per nozzle basis, improved uniformity compensation (e.g., more accurate, faster, less operator burden, etc.) over conventional methods may be achieved. In one embodiment, a uniformity compensated halftone is generated for each drop size of the halftone design. This produces the current threshold array, which is employed for printing or printing the uniformity calibration step chart.

In another embodiment, at processing block 570, the uniformity compensated halftone for each of the pel forming elements is transmitted. In yet another embodiment, at processing block 570, a message is transmitted indicating that the uniformity compensated halftone has not been achieved (e.g., request revised print image measurement data corresponding to printing a revised uniformity calibration step chart with the revised uniformity compensated halftones).

Subsequently, control is returned to processing block 510, where the uniformity compensated halftone is received as an updated halftone. This loop is repeated for as many iterations that are needed to satisfy the condition of decision block 540. When a threshold array is generated which satisfies the OD variation criteria it may be used for all subsequent printing. The uniformity compensated threshold arrays may be saved with the current conditions, such as the paper type. Subsequent printing, using the same identified paper type and/or halftones, may employ the corresponding saved uniformity compensated threshold array.

Figure 6:
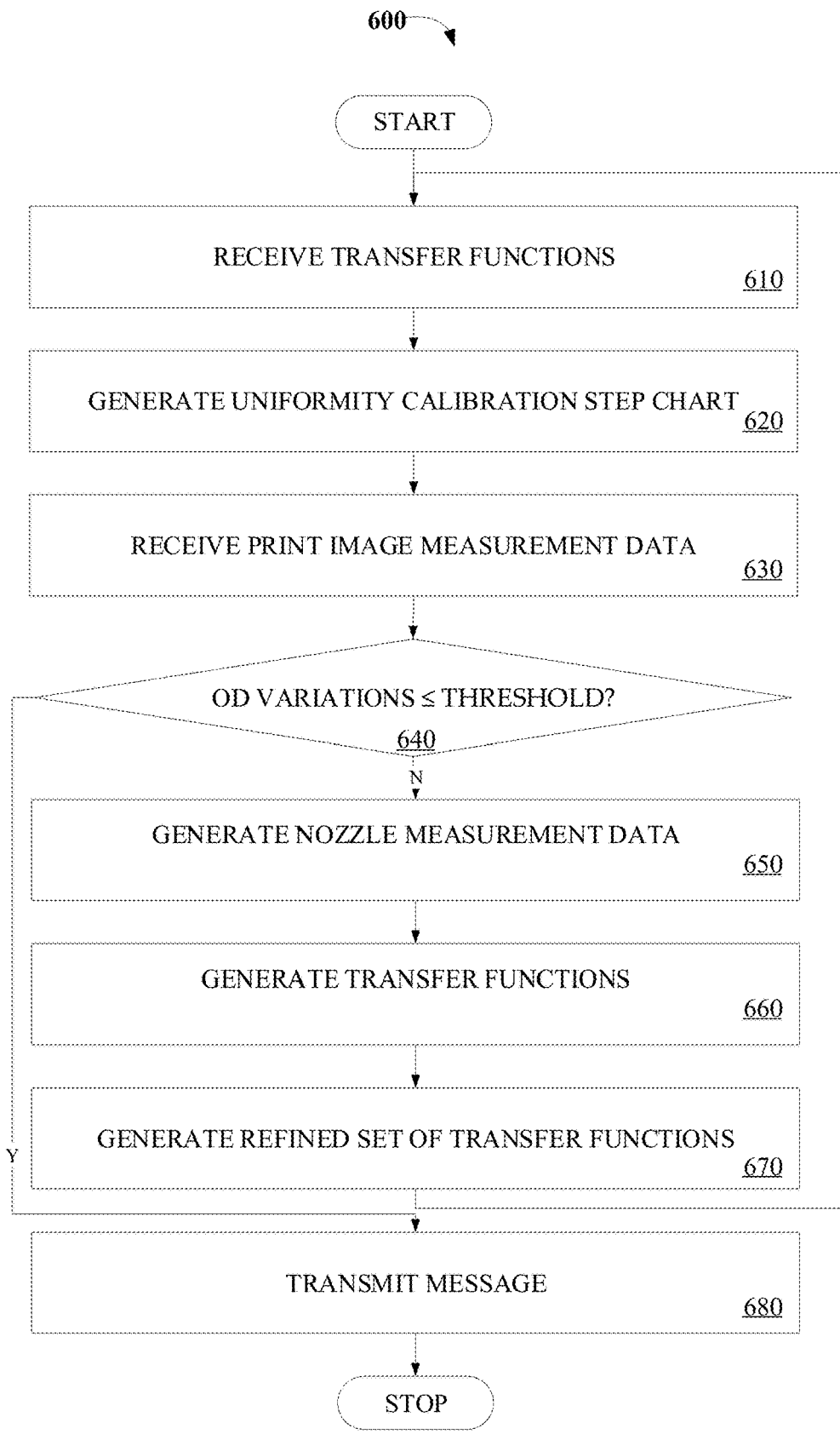
FIG. 6 is a flow diagram illustrating another embodiment of a uniformity compensation process performed by a printing system.

FIG. 6 is a flow diagram illustrating another process 600 for performing uniformity compensation. In this process transfer functions for each nozzle, based on a cascaded process, are employed. Process 600 may be performed by processing logic that may include hardware (e.g., circuitry, dedicated logic, programmable logic, microcode, etc.), software such as instructions run on a processing device, or a combination thereof. In one embodiment, process 600 is performed by uniformity compensation module 310.

At processing block 610, transfer functions are received. At processing block 620, a uniformity calibration step chart is generated by applying the transfer functions. At processing block 630, the uniformity calibration chart is printed and print image measurement data from measuring the chart, including the OD measurement data, is received. At decision block 640, a determination is made as to whether OD variations are less than or equal to the predetermined threshold. If so, a message is transmitted indicating that a uniformity compensated set of transfer functions has been obtained, processing block 680.

However, nozzle measurement data is generated upon a determination that the OD variations are greater than the predetermined threshold, processing block 650. At processing block 660, transfer functions are generated for each nozzle for the current iteration. At processing block 670, a refined set of cumulative transfer function (cascaded transfer functions) are generated by modifying the previous transfer function sets for the nozzles.

In another embodiment, the refined set of cumulative transfer functions are transmitted at processing block 670. In yet another embodiment, at processing block 670 a message is transmitted indicating that the uniformity compensated halftone has not been achieved (e.g., request revised print image measurement data corresponding to printing a revised uniformity calibration step chart with the revised transfer functions applied). Subsequently, control is returned to processing block 610, where the process is repeated. Once a refined set of cumulative transfer functions has been generated that satisfies the OD variation criteria, the cumulative transfer functions may be used for all subsequent printing. The uniformity compensated set of cumulative transfer functions may be saved with the current conditions, such as the paper type and halftone. Subsequent printing, using the same identified paper type and/or halftones, will utilize the corresponding saved sets of refined cumulative transfer functions.

Note that the cascaded refined cumulative transfer function approach described may be employed in printing systems that do not have point operation halftoning, using threshold arrays. The described uniformity system, employing a refined set of cascaded transfer functions, can be employed in printers having neighborhood halftoning implemented, such as error diffusion.

Uniformity compensation module 310 implements the above-described iterative uniformity compensation processes for each primary ink color (e.g., CMYK) to minimize residual non-conformity arising from nozzle interactions and print head misalignments. Additionally, Uniformity compensation module 310 may perform uniformity compensation for secondary colors (e.g., Red, Green and Blue (RGB) colors). In such an embodiment, uniformity compensation is performed for each secondary color, which is comprised of two colors blended according to a prescribed pair of primary color values at each tint. As used herein, a color is defined as a unique combination of primary ink tints, while a tint is defined as an areal density of a primary ink.

Referring to FIG. 3, calibration module 216 also includes missing neighbor function logic 320. According to one embodiment, missing neighbor function logic 320 is implemented to compute missing neighbor functions for primary and/or secondary colors. For uniformity compensated transfer function embodiments, the missing neighbor functions comprise Missing Neighbor Transfer Functions (MNTFs) (e.g., one or more average missing neighbor transfer functions). For uniformity compensated halftone embodiments, the missing neighbor functions comprise Missing Neighbor Threshold Lowering Functions (MTLFs) (e.g., one or more average missing neighbor threshold lowering functions). In this embodiment, halftone design thresholds for neighbors of a missing pel forming element 165 will be lowered. Lowering the thresholds produces a given drop size at lower contone image pixel values. This in turn has the effect of darkening the neighboring regions of the missing pel forming element 165 in the halftone design.

In one embodiment, missing neighbor function logic 320 receives the uniformity compensated data generated at uniformity compensation module 310. As discussed above, the uniformity compensated data may include transfer function data related to transfer function per nozzle for primary colors and/or transfer function per nozzle for secondary colors for transfer function embodiments, and uniformity compensated halftone data related to halftone threshold array per nozzle for each primary color of ink for halftone embodiments. Transfer functions, based on Secondary colors, are reduced to a set of transfer functions for primary colors.

In a further embodiment, missing neighbor function logic 320 generates missing neighbor step charts that include a removal (e.g., not providing nozzle fire instructions to eject ink on the print medium) of well-separated nozzles from the interior of each print-head segment in an original step chart. Subsequently, the missing-neighbor step charts are printed and measured (e.g., at measurement module 190) to generate missing neighbor measurement data. Thus, the missing neighbor corrected measurement data is generated without using one or more of the pluralities of pel forming elements in known locations.

In one embodiment, uniformity compensation module 310 is implemented to generate missing neighbor uniformity compensation data (or missing neighbor corrected data) based on the missing neighbor measurement data. In such an embodiment, the missing neighbor corrected data is generated via the iterative uniformity processes described above with reference to FIG. 5 and FIG. 6. As a result, the missing neighbor corrected data includes missing neighbor corrected transfer functions, or missing neighbor corrected halftone designs (e.g., based on missing neighbor corrected inverse transfer functions), per nozzle.

According to one embodiment, missing neighbor function logic 320 uses the missing neighbor corrected data and the uniformity compensated data to generate the missing neighbor functions. In such an embodiment, missing neighbor function logic 320 derives MNTFs and MNTLFs by comparing the missing neighbor corrected data to the uniformity compensated data. Thus, the MNTFs maps uniformity corrected data values to missing neighbor corrected data values for each level in a transfer function, while MNTLF maps uniformity corrected data thresholds to missing neighbor data thresholds. In a further embodiment, the MNTF mapping comprises performing an interpolation between the uniformity corrected data values and the missing neighbor corrected data values to form the complete MNTF, while the MNTLF mapping comprises performing an interpolation between the uniformity corrected data thresholds and the missing neighbor data thresholds to form the complete MNTLF.

Figure 7:
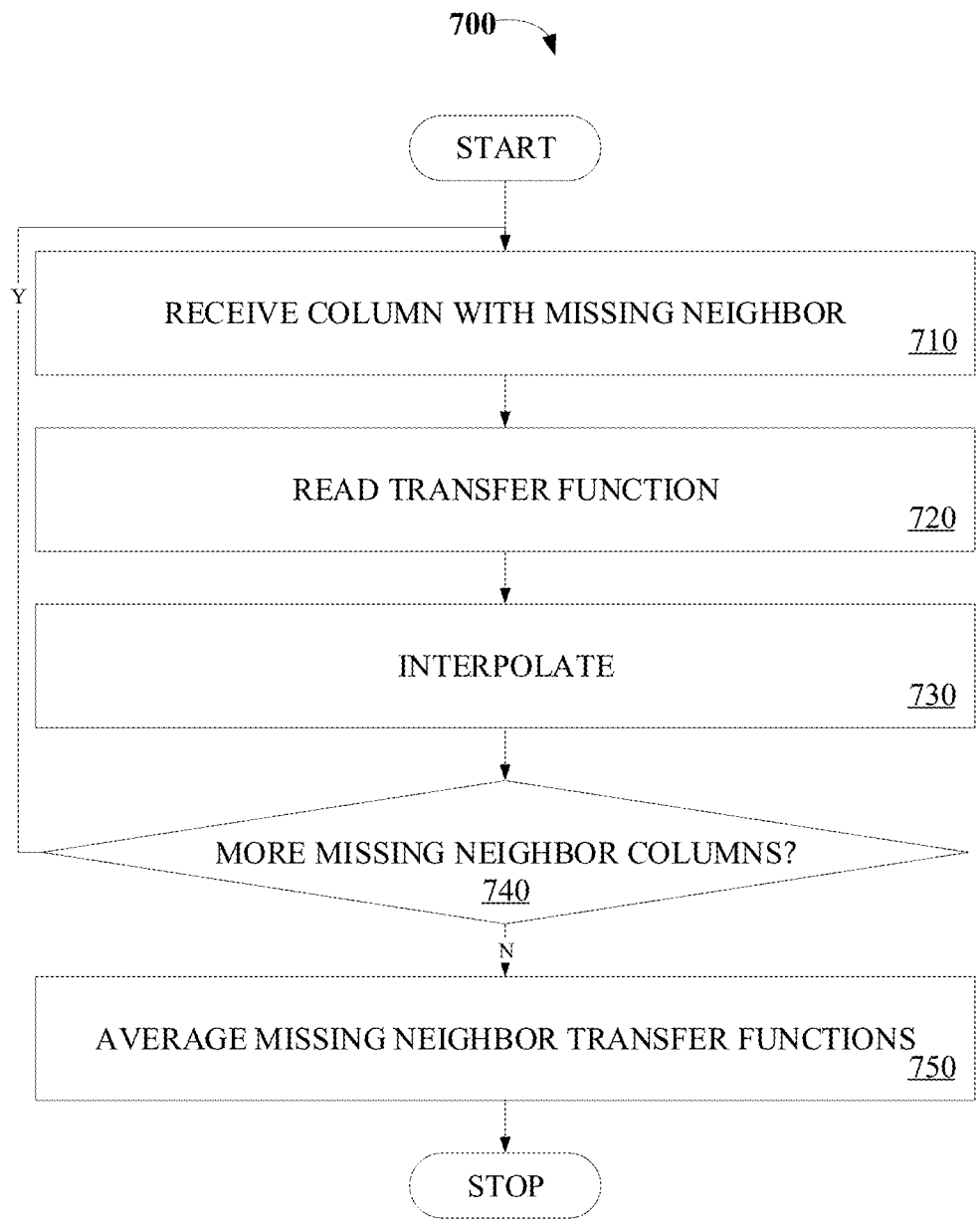
FIG. 7 is a flow diagram illustrating one embodiment of a process for generating Missing Neighbor Transfer Functions.

FIG. 7 is a flow diagram illustrating one embodiment of a process 700 for generating MNTFs. Process 700 may be performed by processing logic that may include hardware (e.g., circuitry, dedicated logic, programmable logic, microcode, etc.), software such as instructions run on a processing device, or a combination thereof. In one embodiment, process 700 is performed by missing neighbor function logic 320.

Process 700 begins at processing block 710, where a position value for a column having a missing neighbor is received. At processing block 720, a transfer function is read (e.g., missing neighbor corrected data value and uniformity corrected data value) for each level. At processing block 730, an interpolation is performed between the missing neighbor corrected data and the uniformity corrected data value to generate a MNTF. At decision block 740, a determination is made as to whether more additional columns having missing neighbors are available. If so, control is returned to processing block 710, where another column having missing neighbors is received. Otherwise, an average of all MNTFs is computed for each of a plurality of printheads to generate an average MNTF for each of the plurality of printheads, processing block 750. In a further embodiment, the average MNTFs may further be averaged across all printheads.

Figure 8:
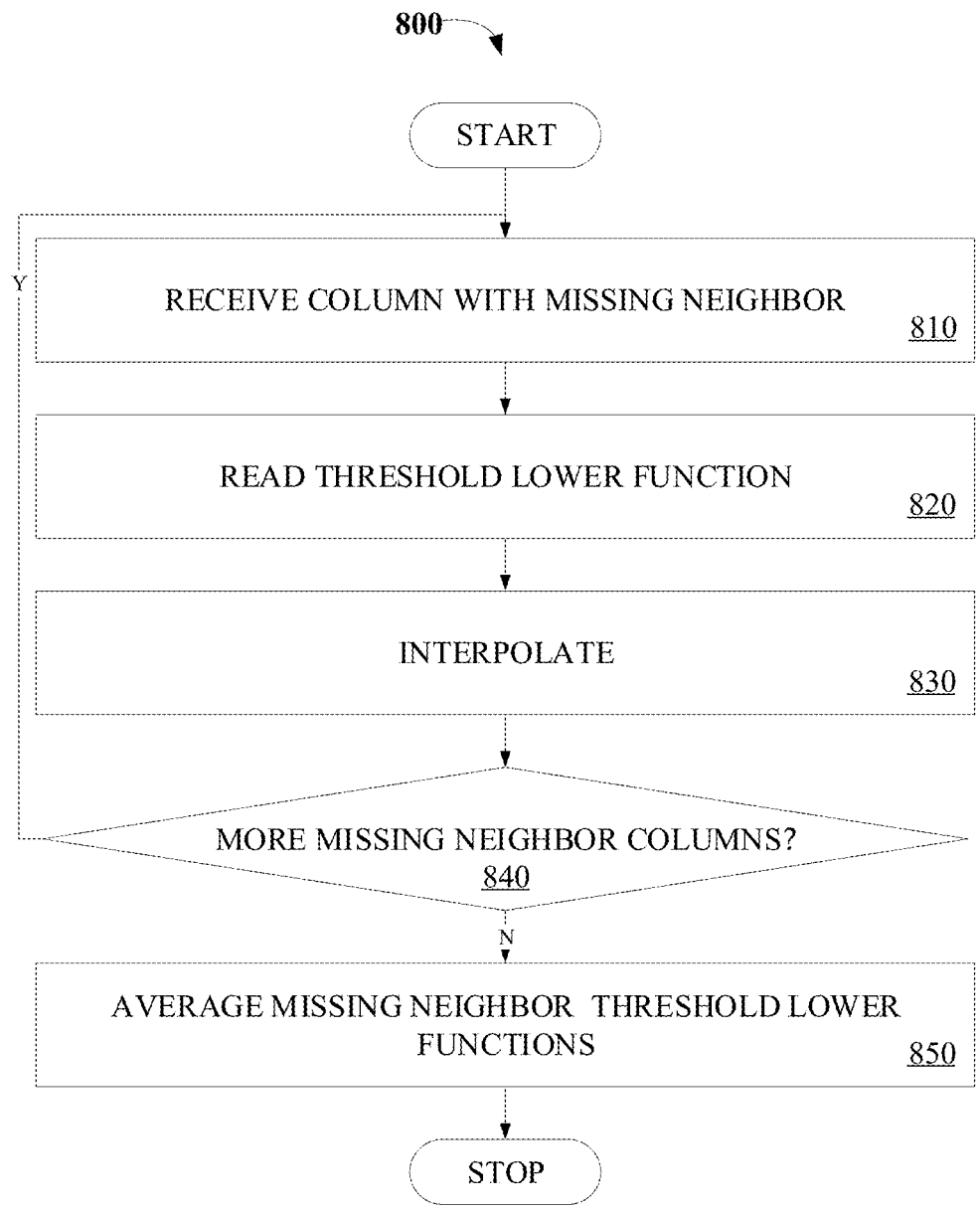
FIG. 8 is a flow diagram illustrating one embodiment of a process for generating Missing Neighbor Threshold Lowering Functions.

FIG. 8 is a flow diagram illustrating one embodiment of a process 800 for generating MNTLFs. Process 800 may be performed by processing logic that may include hardware (e.g., circuitry, dedicated logic, programmable logic, microcode, etc.), software such as instructions run on a processing device, or a combination thereof. In one embodiment, process 800 is performed by missing neighbor function logic 320.

Process 800 begins at processing block 810, where a position value for a column having a missing neighbor is received. At processing block 820, a threshold lowering function is read (e.g., missing neighbor corrected threshold) for each level (e.g., uniformity corrected threshold). FIG. 9 illustrates one embodiment of original and missing neighbor thresholds. At processing block 830, an interpolation is performed between the missing neighbor corrected threshold and the uniformity corrected threshold to generate a MNTLF. At decision block 840, a determination is made as to whether more additional columns with missing neighbors are available. If so, control is returned to processing block 810, where another column having a missing neighbor is received. Otherwise, an average of the MNTLFs is computed for each print head to generate an average MNTLF for each printhead, processing block 850. In a further embodiment, the average MNTLFs may further be averaged across all printheads.

Figure 10:
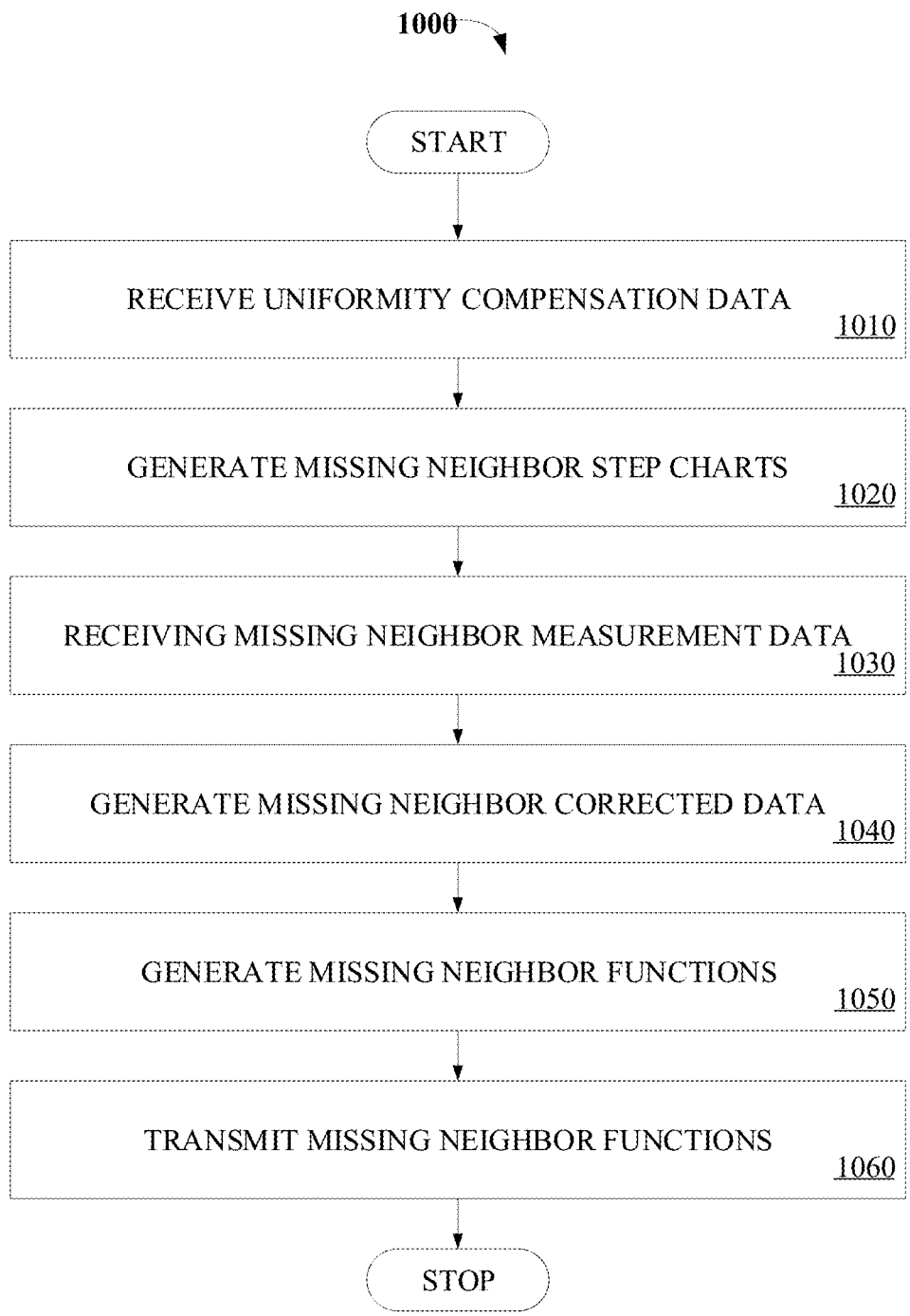
FIG. 10 is a flow diagram illustrating one embodiment of a missing neighbor process.

FIG. 10 is a flow diagram illustrating one embodiment of a missing neighbor process 1000. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by missing neighbor function logic 320.

Process 1000 begins at processing block 1010, where the uniformity compensation data is received. At processing block 1020, the missing neighbor step chart are generated. At processing block 1030, the missing neighbor measurement data is received (e.g., after the printing and measuring of the missing neighbor step chart). At processing block 1040, the missing neighbor corrected data is generated.

At processing block 1050, the missing neighbor functions are generated as discussed above with reference to FIGS. 7 and 8. At processing block 1060, the missing neighbor functions (e.g., the one or more average missing neighbor transfer functions, the one or more average missing neighbor threshold lowering functions, etc.) are transmitted. In one embodiment, the missing neighbor functions are transmitted, along with the original uniformity compensation data (e.g., transfer functions and halftone designs) to nozzle correction logic 168 included in printer 160.

Referring to FIG. 2, print controller 140 includes nozzle analysis logic 230. In one embodiment, nozzle analysis logic 230 receives measurement data (e.g., an image scan data) of print medium 180 (e.g., via measurement module 190) during print job production. In such an embodiment, nozzle analysis logic 230 analyzes the image scan data during print production to detect jet-out data associated with one or more defective (or missing) pel forming elements 165. In a further embodiment, nozzle analysis logic 230 generates a defective nozzle list that includes all pel forming elements 165 that are determined to be defective. Thus, each pel forming element 165 that is determined to be missing/defective is added to the defective nozzle list. Once generated, the defective nozzle list is transmitted to nozzle correction logic 168. In one embodiment, the defective nozzle list is transmitted with each bitmap 150 transmitted to printer 160.

Figure 11:
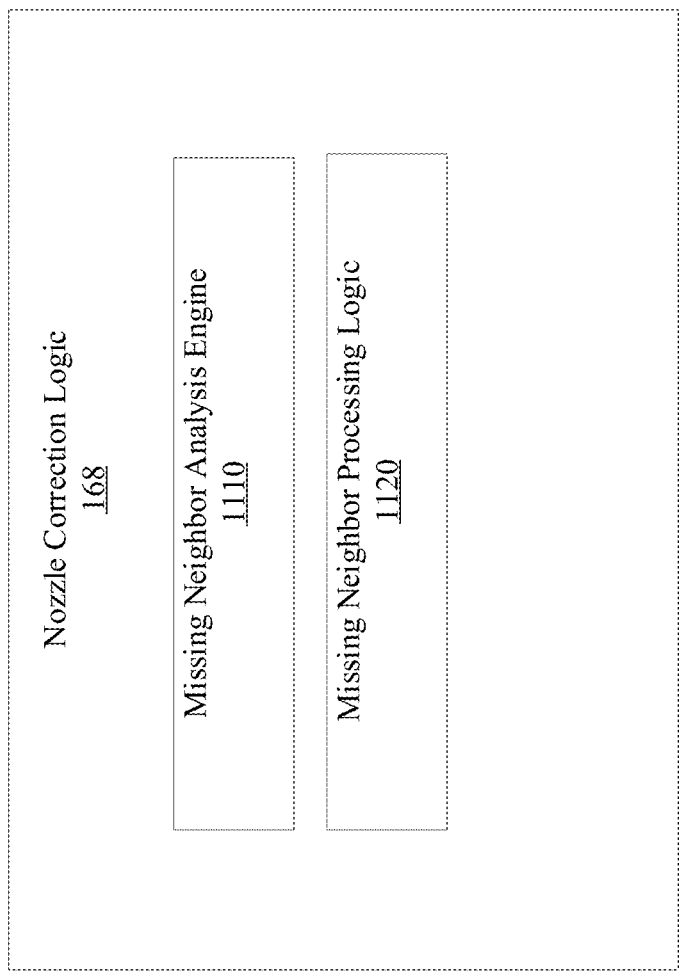
FIG. 11 illustrates one embodiment of nozzle correction logic.

FIG. 11 illustrates one embodiment of nozzle correction logic 168. As shown in FIG. 11, nozzle correction logic 168 includes missing neighbor analysis engine 1110 and missing neighbor processing logic 1120. Missing neighbor analysis engine 1110 receives the missing neighbor functions and the original uniformity compensation data from calibration module 216, as well as the defective nozzles list from nozzle analysis logic 230. During print processing, missing neighbor analysis engine 1110 uses the defective nozzles list to analyze pel forming elements 165 in each column, to determine whether a pel forming element 165 is a neighbor of a missing/defective pel forming element 165.

In one embodiment, missing neighbor analysis engine 1110 determines whether a pel forming element 165 is an adjacent (e.g., left neighbor and/or right neighbor) of a missing/defective pel forming element 165 (e.g., pel forming element x=x'−1, where x'=defective pel forming element column number) indicated in the defective nozzles list. In a further embodiment, missing neighbor analysis engine 1110, upon a determination that the pel forming element 165 is not a left neighbor of a missing/defective pel forming element 165, implements a normal tone curve (e.g., a tone curve associated with the uniformity compensated transfer function) and/or normal halftone (e.g., halftone associated with the uniformity compensated transfer function) to print bitmap data to the print medium via the pel forming element 165. However, missing neighbor processing logic 1120 performs missing neighbor processing using the missing neighbor functions (e.g., MNTF or MNTLF) upon a determination that that the pel forming element 165 is a left neighbor of a missing/defective pel forming element 165.

According to one embodiment, missing neighbor processing logic 1120 performs the missing neighbor processing by applying missing neighbor halftoning (e.g., via MNTLF) or correction (e.g., via MNTF) at the left adjacent neighbor pel forming element (x) and/or the right adjacent neighbor pel forming element (x+2) of the missing/defective pel forming element (x'), while bypassing the processing of x'. In a further embodiment, two nearest neighbors on each side of the missing jet may be corrected in embodiments in which the dot gain is such that there is a significant amount of ink that comes from the nearest neighbor. Subsequently, the process is repeated for each column, row pel coordinate (x,y) in a column.

Figure 12:
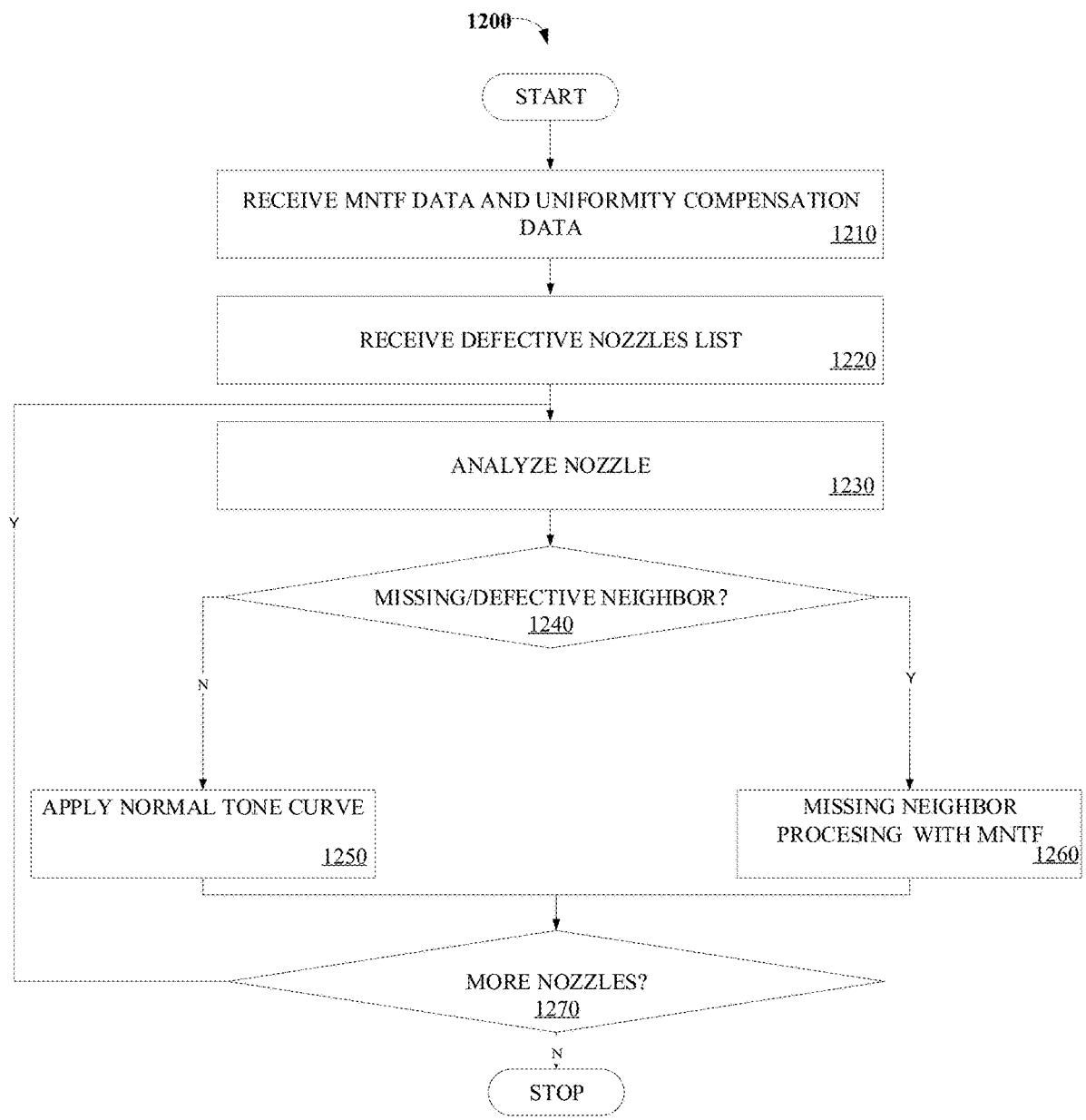
FIG. 12 is a flow diagram illustrating one embodiment of a nozzle correction process.

FIG. 12 is a flow diagram illustrating one embodiment of a nozzle correction process 1200 to apply missing neighbor correction via MNTFs. Process 1200 may be performed by processing logic that may include hardware (e.g., circuitry, dedicated logic, programmable logic, microcode, etc.), software such as instructions run on a processing device, or a combination thereof. In one embodiment, process 1200 is performed by nozzle correction logic 168.

Process 1200 begins at processing block 1210, where the missing neighbor functions and the original uniformity compensation data are received. At processing block 1220, the defective nozzles list is received. At processing block 1230, a pel forming element 165 (e.g., a nozzle) is analyzed. At decision block 1240, a determination is made as to whether the nozzle is an adjacent (e.g., left neighbor) of a missing/defective nozzle. If not, a normal tone curve is applied to print bitmap data to the print medium using the nozzle, processing block 1250. Otherwise, missing neighbor processing is performed using a MNTF associated with the nozzle, processing block 1260.

In one embodiment, the MNTF is applied (or used) to perform missing neighbor processing by cascading the MNTF for the nozzle with the uniformity corrected transfer function to print data (e.g., Print $T_{MIN}(T_x(g))$, where $T_{MIN}$ is the missing neighbor transfer function, $T_x$ is the uniformity corrected transfer function and g is the pixel value. As discussed above, the missing neighbor processing is performed for the left neighbor and/or the right neighbor of the missing/defective nozzle, while no data is applied by the defective nozzle. Once missing neighbor processing has been performed, a determination is made as to whether there are more nozzles to analyze, decision block 1270. If so, control is returned to processing block 1230, where the next nozzle is analyzed. Otherwise, the process is completed.

Figure 13:
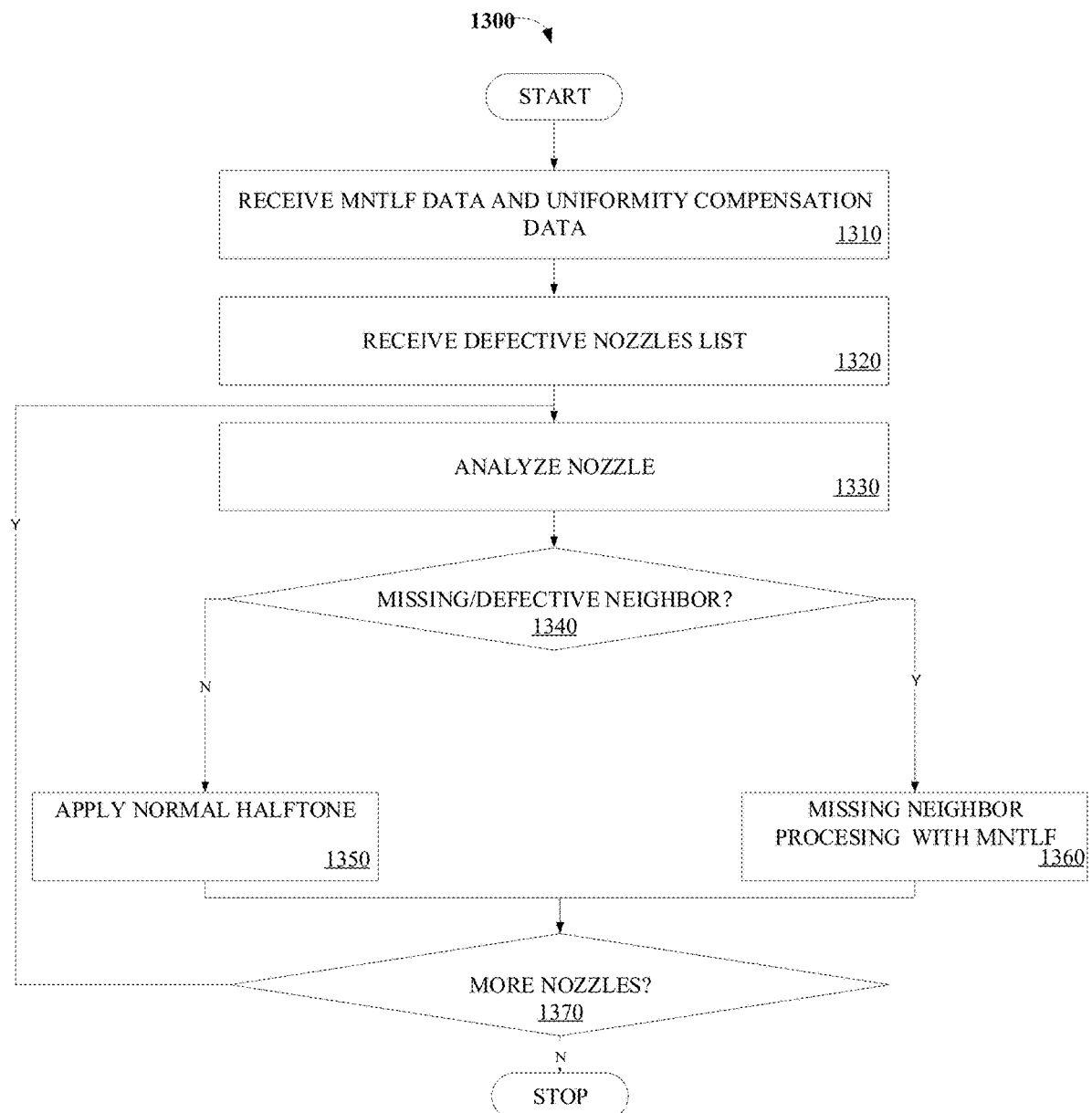
FIG. 13 is a flow diagram illustrating another embodiment of a nozzle correction process.

FIG. 13 is a flow diagram illustrating one embodiment of a nozzle correction process 1300 to apply missing neighbor correction via MNTLFs. Process 1300 may be performed by processing logic that may include hardware (e.g., circuitry, dedicated logic, programmable logic, microcode, etc.), software such as instructions run on a processing device, or a combination thereof. In one embodiment, process 1300 is performed by nozzle correction logic 168.

Process 1300 begins at processing block 1310, where the missing neighbor functions and the original uniformity compensation data are received. At processing block 1320, the defective nozzles list is received. At processing block 1330, a nozzle is analyzed. At decision block 1340, a determination is made as to whether the nozzle is a left adjacent neighbor of a missing/defective nozzle. If not, a normal halftone is applied to print bitmap data to the print medium using the nozzle, processing block 1350. Otherwise, missing neighbor processing is performed using a MNTLF associated with the nozzle, processing block 1360.

In one embodiment, the MNTLF is used to perform missing neighbor processing by applying the threshold lowering function to the uniformity corrected halftone design to generate a missing neighbor corrected halftone design, such that $h_{ijk}=\text{TLF}(h_{ijk})$, where $h_{ijk}$ is the missing neighbor corrected halftone design and $h_{ijk}$ is the uniformity corrected halftone design. Subsequently, halftoning is performed using the missing neighbor corrected halftone design. As discussed above, the missing neighbor processing is performed for the left neighbor and/or the right neighbor of the missing/defective nozzle, while no data is applied by the defective nozzle.

At decision block 1370, a determination is made as to whether there are additional nozzles to analyze. If so, control is returned to processing block 1330, where the next nozzle is analyzed. Otherwise, the process is completed. In embodiments, processes 1200 and 1300 are performed for each primary color. However, in other embodiments, processes 1200 and 1300 may also be performed for secondary colors.

Figure 14:
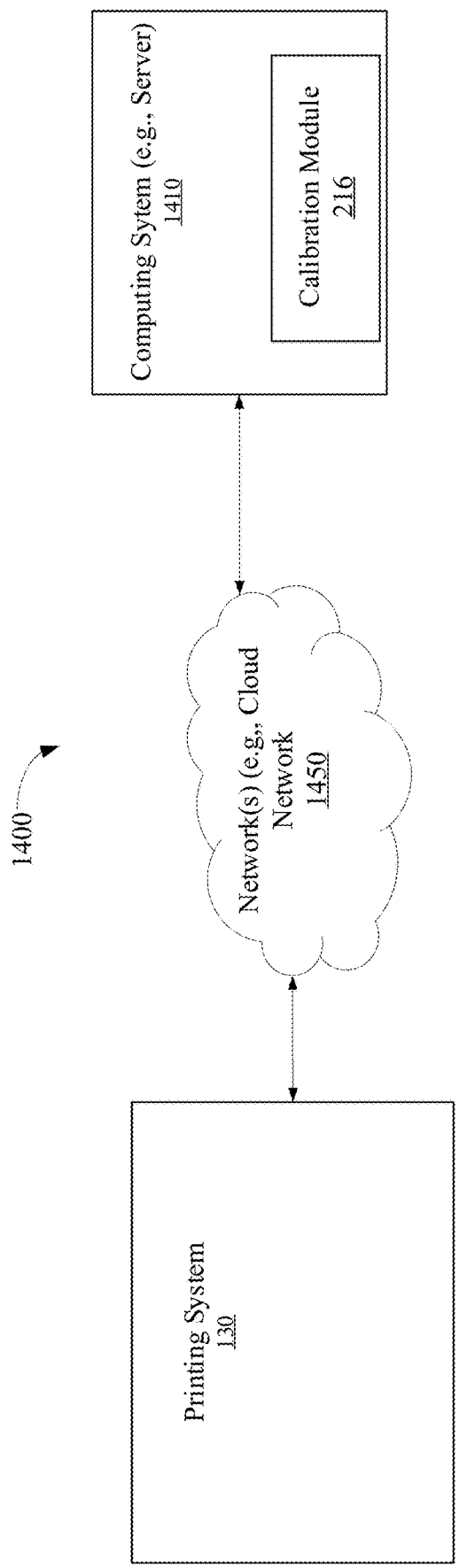
FIG. 14 illustrates one embodiment of a calibration module implemented in a network.

Although shown as a component of print controller 140, other embodiments may feature calibration module 216 included within an independent device, or combination of devices, communicably coupled to print controller 140. For instance, FIG. 14 illustrates one embodiment of a calibration module 216 implemented in a network 1400. As shown in FIG. 14, calibration module 216 is included within a computing system 1410 and transmits calibrated halftones 220 to printing system 130 via a cloud network 1450.

Figure 15:
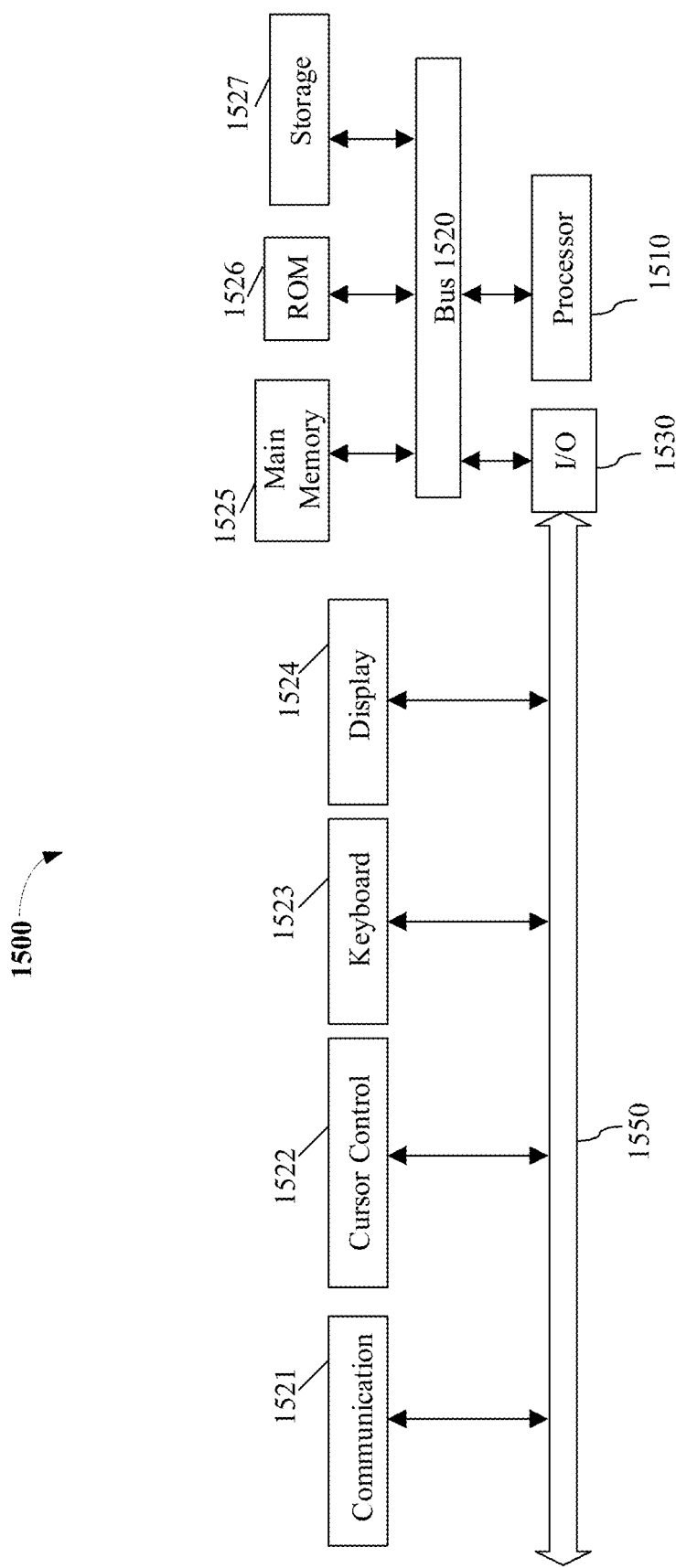
FIG. 15 illustrates one embodiment of a computer system.

FIG. 15 illustrates a computer system 1500 on which printing system 130, computing system 1410, nozzle analysis logic 230 and/or calibration module 216 may be implemented. Computer system 1500 includes a system bus 1520 for communicating information, and a processor 1510 coupled to bus 1520 for processing information.

Computer system 1500 further comprises a random access memory (RAM) or other dynamic storage device 1525 (referred to herein as main memory), coupled to bus 1520 for storing information and instructions to be executed by processor 1510. Main memory 1525 also may be used for storing temporary variables or other intermediate information during execution of instructions by processor 1510. Computer system 1500 also may include a read only memory (ROM) and or other static storage device 1526 coupled to bus 1520 for storing static information and instructions used by processor 1510.

A data storage device 1527 such as a magnetic disk or optical disc and its corresponding drive may also be coupled to computer system 1500 for storing information and instructions. Computer system 1500 can also be coupled to a second I/O bus 1550 via an I/O interface 1530. A plurality of I/O devices may be coupled to I/O bus 1550, including a display device 1524, an input device (e.g., an alphanumeric input device 1523 and or a cursor control device 1522). The communication device 1521 is for accessing other computers (servers or clients). The communication device 1521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store nozzle correction logic and one or more processors coupled with at least one physical memory device to execute the nozzle correction logic to receive a uniformity compensated transfer function for each of a plurality of pel forming elements, receive an average missing neighbor transfer function, receive a defective nozzles list including one or more of the plurality of pel forming elements indicated as defective during print production and perform missing neighbor processing by applying the average missing neighbor transfer function associated with the pel forming element determined to be a neighbor of a defective pel forming element.

Example 2 includes the subject matter of Example 1, wherein the nozzle correction logic determines whether a first pel forming element is adjacent to a defective pel forming element indicated in the defective nozzles list and applies a tone curve associated with the uniformity compensated transfer function to print bitmap data via the pel forming element upon a determination that the first pel forming element is not adjacent to the defective pel forming element.

Example 3 includes the subject matter of Examples 1 and 2, wherein the nozzle correction logic performs the missing neighbor processing upon a determination that the first pel forming element is adjacent to the defective pel forming element.

Example 4 includes the subject matter of Examples 1-3, wherein performing the missing neighbor processing comprises applying the average missing neighbor transfer function to a first neighbor pel forming element adjacent to the defective pel forming element.

Example 5 includes the subject matter of Examples 1-4, wherein performing the missing neighbor processing further comprises applying the average missing neighbor transfer function to a second neighbor pel forming element adjacent to the defective pel forming element.

Example 6 includes the subject matter of Examples 1-5, wherein performing the missing neighbor processing further comprises bypassing the processing of the defective pel forming element.

Example 7 includes the subject matter of Examples 1-6, wherein applying the average missing neighbor transfer function comprises cascading the average missing neighbor transfer function with the uniformity compensated transfer function associated with the pel forming element.

Example 8 includes the subject matter of Examples 1-7, further comprising a print engine comprising the plurality of pel forming elements.

Some embodiments pertain to Example 9 that includes at least one computer readable medium having instructions stored thereon, which when executed by one or more processors, cause the processors to receive a uniformity compensated transfer function for each of a plurality of pel forming elements, receive an average missing neighbor transfer function, receive a defective nozzles list including one or more of the plurality of pel forming elements indicated as defective during print production and perform missing neighbor processing by applying the average missing neighbor transfer function associated with the pel forming element determined to be a neighbor of a defective pel forming element.

Example 10 includes the subject matter of Example 9, having instructions stored thereon, which when executed by one or more processors, cause the processors to determine whether a first pel forming element is adjacent to a defective pel forming element indicated in the defective nozzles list and apply a tone curve associated with the uniformity compensated transfer function to print bitmap data via the pel forming element upon a determination that the first pel forming element is not adjacent to the defective pel forming element.

Example 11 includes the subject matter of Examples 9 and 10, having instructions stored thereon, which when executed by one or more processors, cause the processors to perform the missing neighbor processing upon a determination that the first pel forming element is adjacent to the defective pel forming element.

Example 12 includes the subject matter of Examples 9-11, wherein performing the missing neighbor processing comprises applying the average missing neighbor transfer function to a first neighbor pel forming element adjacent to the defective pel forming element.

Example 13 includes the subject matter of Examples 9-12, wherein performing the missing neighbor processing further comprises applying a second missing neighbor transfer function associated with a second neighbor pel forming element adjacent to the defective pel forming element.

Example 14 includes the subject matter of Examples 9-13, wherein performing the missing neighbor processing further comprises bypassing the processing of the defective pel forming element.

Example 15 includes the subject matter of Examples 9-14, wherein applying the average missing neighbor transfer function comprises cascading the average missing neighbor transfer function with the uniformity compensated transfer function associated with the pel forming element.

Some embodiments pertain to Example 16 that includes a method comprising receiving a uniformity compensated transfer function for each of a plurality of pel forming elements, receiving an average missing neighbor transfer function, receiving a defective nozzles list including one or more of the plurality of pel forming elements indicated as defective during print production and performing missing neighbor processing by applying the average missing neighbor transfer function associated with the pel forming element determined to be a neighbor of a defective pel forming element.

Example 17 includes the subject matter of Example 16, further comprises determining whether a first pel forming element is adjacent to a defective pel forming element indicated in the defective nozzles list and applying a tone curve associated with the uniformity compensated transfer function to print bitmap data via the pel forming element upon a determination that the first pel forming element is not adjacent to the defective pel forming element.

Example 18 includes the subject matter of Examples 16 and 17, further comprising performing the missing neighbor processing upon a determination that the first pel forming element is adjacent to the defective pel forming element.

Example 19 includes the subject matter of Examples 16-18, wherein performing the missing neighbor processing comprises applying the average missing neighbor transfer function to a first neighbor pel forming element adjacent to the defective pel forming element and applying the average missing neighbor transfer function to a second neighbor pel forming element adjacent to the defective pel forming element.

Example 20 includes the subject matter of Examples 16-19, wherein performing the missing neighbor processing further comprises bypassing the processing of the defective pel forming element.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store nozzle correction logic; and
   one or more processors coupled with at least one physical memory device to execute the nozzle correction logic to:
   receive a uniformity compensated transfer function for each of a plurality of pel forming elements;
   receive an average missing neighbor transfer function;
   receive a defective nozzles list including one or more of the plurality of pel forming elements indicated as defective during print production; and
   perform missing neighbor processing by applying the average missing neighbor transfer function associated with the pel forming element determined to be a neighbor of a defective pel forming element.

2. The system of claim 1, wherein the nozzle correction logic determines whether a first pel forming element is adjacent to a defective pel forming element indicated in the defective nozzles list and applies a tone curve associated with the uniformity compensated transfer function to print bitmap data via the pel forming element upon a determination that the first pel forming element is not adjacent to the defective pel forming element.

3. The system of claim 2, wherein the nozzle correction logic performs the missing neighbor processing upon a determination that the first pel forming element is adjacent to the defective pel forming element.

4. The system of claim 3, wherein performing the missing neighbor processing comprises applying the average missing neighbor transfer function to a first neighbor pel forming element adjacent to the defective pel forming element.

5. The system of claim 4, wherein performing the missing neighbor processing further comprises applying the average missing neighbor transfer function to a second neighbor pel forming element adjacent to the defective pel forming element.

6. The system of claim 2, wherein performing the missing neighbor processing further comprises bypassing the processing of the defective pel forming element.

7. The system of claim 1, wherein applying the average missing neighbor transfer function comprises cascading the average missing neighbor transfer function with the uniformity compensated transfer function associated with the pel forming element.

8. The system of claim 1, further comprising a print engine comprising the plurality of pel forming elements.

9. At least one non-transitory computer readable medium having instructions stored thereon, which when executed by one or more processors, cause the processors to:
   receive a uniformity compensated transfer function for each of a plurality of pel forming elements;
   receive an average missing neighbor transfer function;
   receive a defective nozzles list including one or more of the plurality of pel forming elements indicated as defective during print production; and
   perform missing neighbor processing by applying the average missing neighbor transfer function associated with the pel forming element determined to be a neighbor of a defective pel forming element.

10. The computer readable medium of claim 9, having instructions stored thereon, which when executed by one or more processors, cause the processors to:
    determine whether a first pel forming element is adjacent to a defective pel forming element indicated in the defective nozzles list; and
    apply a tone curve associated with the uniformity compensated transfer function to print bitmap data via the pel forming element upon a determination that the first pel forming element is not adjacent to the defective pel forming element.

11. The computer readable medium of claim 10, having instructions stored thereon, which when executed by one or more processors, cause the processors to perform the missing neighbor processing upon a determination that the first pel forming element is adjacent to the defective pel forming element.

12. The computer readable medium of claim 11, wherein performing the missing neighbor processing comprises applying the average missing neighbor transfer function to a first neighbor pel forming element adjacent to the defective pel forming element.

13. The computer readable medium of claim 12, wherein performing the missing neighbor processing further comprises applying a second missing neighbor transfer function associated with a second neighbor pel forming element adjacent to the defective pel forming element.

14. The computer readable medium of claim 10, wherein performing the missing neighbor processing further comprises bypassing the processing of the defective pel forming element.

15. The computer readable medium of claim 9, wherein applying the average missing neighbor transfer function comprises cascading the average missing neighbor transfer function with the uniformity compensated transfer function associated with the pel forming element.

16. A method comprising:
receiving a uniformity compensated transfer function for each of a plurality of pel forming elements;
receiving an average missing neighbor transfer function;
receiving a defective nozzles list including one or more of the plurality of pel forming elements indicated as defective during print production; and
performing missing neighbor processing by applying the average missing neighbor transfer function associated with the pel forming element determined to be a neighbor of a defective pel forming element.

17. The method of claim 16, further comprises:
determining whether a first pel forming element is adjacent to a defective pel forming element indicated in the defective nozzles list; and
applying a tone curve associated with the uniformity compensated transfer function to print bitmap data via the pel forming element upon a determination that the first pel forming element is not adjacent to the defective pel forming element.

18. The method of claim 17, further comprising performing the missing neighbor processing upon a determination that the first pel forming element is adjacent to the defective pel forming element.

19. The method of claim 18, wherein performing the missing neighbor processing comprises:
applying the average missing neighbor transfer function to a first neighbor pel forming element adjacent to the defective pel forming element; and
applying the average missing neighbor transfer function to a second neighbor pel forming element adjacent to the defective pel forming element.

20. The method of claim 17, wherein performing the missing neighbor processing further comprises bypassing the processing of the defective pel forming element.

* * * * *